Nov. 18, 1958   P. L. KNIGHT   2,860,864
RADIANT TUBE HEATER
Filed Jan. 7, 1955   2 Sheets-Sheet 1

INVENTOR.
P. L. KNIGHT
BY
ATTORNEY

Nov. 18, 1958

P. L. KNIGHT 2,860,864

RADIANT TUBE HEATER

Filed Jan. 7, 1955

INVENTOR.
P.L. KNIGHT
BY
Charles S. Haughey
ATTORNEY

United States Patent Office 2,860,864
Patented Nov. 18, 1958

2,860,864

RADIANT TUBE HEATER

Philip L. Knight, Toledo, Ohio, assignor to Surface Combustion Corporation, Toledo, Ohio, a corporation of Ohio Application January 7, 1955, Serial No. 480,465

4 Claims. (Cl. 263—42)

This invention relates to an improved heat-radiating means for supplying heat to a furnace. More specifically the invention pertains to an improved radiant tube such as is used in those heat treating furnaces containing a controlled atmosphere and requiring an indirect heat source.

This radiant tube provides more heat for a given amount of alloy metal used in constructing such tubes, with a resultant saving in metal and, consequently, space in the furnace for a given heat input. Furthermore, the design allows a greater concentration of heat in a furnace. This is an important advantage in cover-type annealing furnaces where a major problem is over-heating in the upper portions of the furnace.

Other advantages and variations of this design will be perceived by the reader.

For a consideration of what I believe to be novel and my invention, attention is directed to the following portion of the specification, the claims, and the accompanying drawing.

Referring to the drawing.

A radiant tube according to the present invention may comprise three tubular elements, arranged symmetrically, with the outer two tubes being firing legs and the middle tube being an exhaust leg, the three tubes entering a header which provides a passage for gases from the firing legs to the exhaust leg. Burners are adapted to fire into the firing legs, and an eductor is preferably attached to the exhaust leg.

Figure 1:
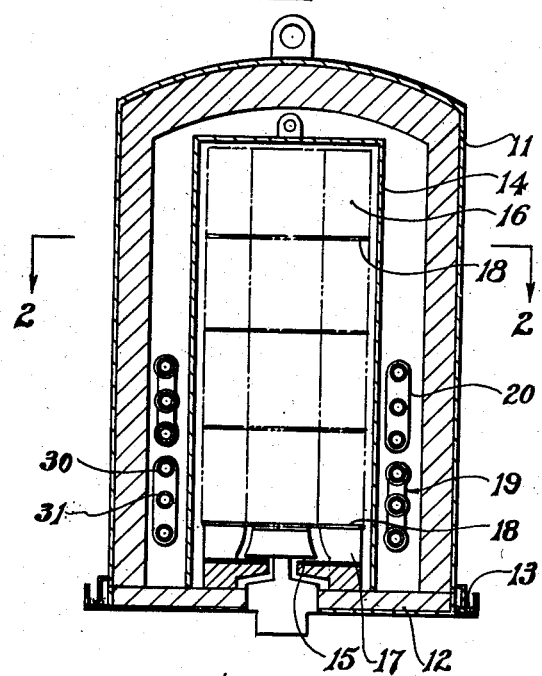
Figure 1 is a vertical section on line 1—1 of a cover-type annealing furnace utilizing this type radiant tube.

The furnace of Figure 1 comprises an outer cover 11, a base 12 on which it rests, a sealing means 13, an inner cover 14 resting on base 12, and a fan 15 for recirculating atmosphere gases admitted to the inner cover 14. There will normally be a gas seal, not shown, at the base of the inner cover 14. Metal coils 16 are separated by coil separators 18. Radiant tubes 19 and bungs 20 may be positioned as low as feasible near the base 12. These tubes 19 are similar to those illustrated in Figure 3.

Figure 2:
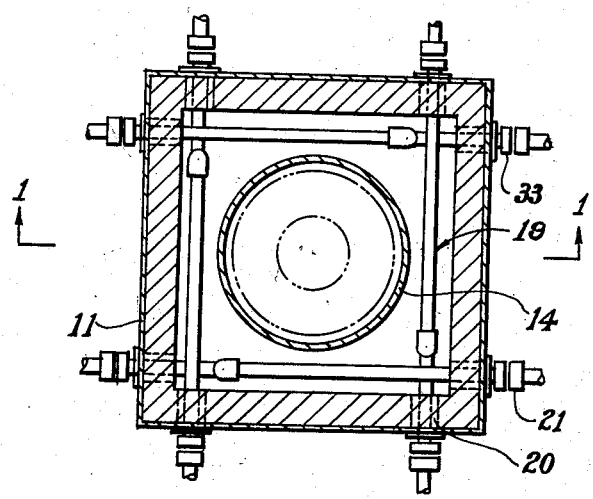
Figure 2 is a horizontal section on line 2—2 of the same furnace referred to in Figure 1.

Two of these radiant tube units 19 may be placed parallel to each wall of the outer cover 11 and between this cover 11 and inner cover 14, as illustrated in Figure 2. Each pair may have the burner ends located in the same or opposite walls. Burners are located at 21. For simplicity, the coils are represented by dashed lines and the fan detail has been omitted from this view.

Figures 3, 4, 5:
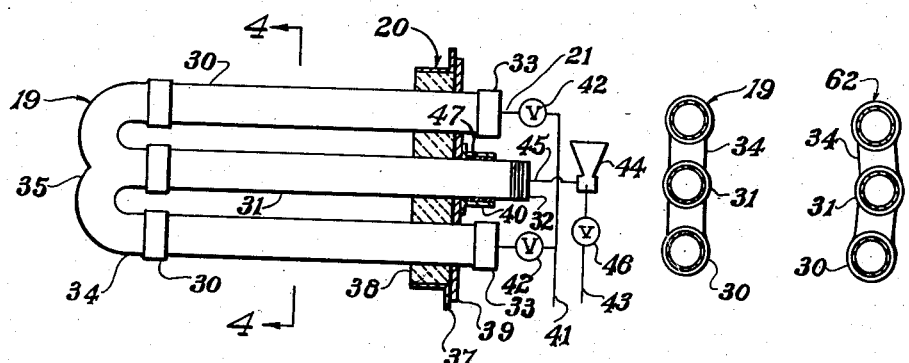
Figure 3 is a side view of a preferred design of this invention.
Figure 4 is a sectional view on line 4—4 of the design shown in Figure 3.
Figure 5 is a sectional view on line 4—4 of a variation of the design shown in Figure 4.

A preferred design of this invention is revealed in Figure 3. Tubes 30 are the firing legs and tube 31 is the exhaust leg of a radiant tube. With the intermediate position of the exhaust leg, the firing legs radiate a portion of their heat thereto instead of toward each other. The exhaust leg is thus symmetrically heated thereby and this leg then affords an additional heat radiating source to the area thereabout. Furthermore, this relationship of the firing and exhaust legs minimizes overheating in the firing legs as occurs if they are placed adjacent so that intermediate portions thereof cannot dissipate heat by radiation. An exhaust means herein shown as eductor 44 is attached to tube 31 with connection means 32. Burner connections are shown at 33. Tubes 30 and 31 are connected by the header 34 which contains semicircular contours 35 for directing combustion products from the firing legs 30 to the exhaust leg 31. The assembly is placed in a single bung 20 for easier installation in, and removal from, the furnace. The bung 20 comprises a flanged frame 37, refractory 38, and cover plate 39. A flange 40 is provided with a packing gland of resilient material 47 positioned between the flange 40 and exhaust leg 31 to permit movement of said exhaust leg 31 during expansion or contraction and still retain a gas tight resilient seal between the exhaust leg 31 and the plate 39. A bellows arrangement may be used here in place of this packing gland. Firing legs 30 are welded gas tightly to cover plate 39.

Open-type burners, as illustrated in my co-pending application, Serial No. 231,934, may be used with this design, wherein air is induced to flow into the firing legs under draft from the exhaust means 44 at the end of exhaust leg 31. A shutter or variable orifice may then be used at each burner to regulate the firing rates. Line 41 represents the gas piping to these burners with a valve 42 located at each burner to regulate the individual gas supplied thereto, the burner being located at 21.

If enclosed type burners, as disclosed in my copending application Serial No. 329,364, now Patent No. 2,764,145, are used, individual controls for each firing leg may be installed in the fuel and air piping.

Line 43 represents air piping for eductor 44 for exhaust leg 31 which is connected to eductor 44 by a tubular passage represented by line 45. A valve 46 is provided to regulate the amount of air for eductor 44.

Figure 6:
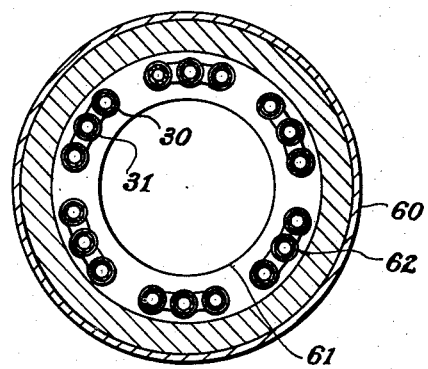
Figure 6 is a horizontal section of a round annealing furnace embodying vertically disposed radiant tubes of the variation shown in Figure 5.

Tubes 30 and 31 may be arranged in a V-shape as illustrated in Figure 5 to more closely conform with a round annealing furnace of the bell or pit type as illustrated in Figure 6. This comprises outer cover 60 and work or container therefor at 61 with the V-shaped units 62 placed vertically therebetween. Although a wide V is illustrated in this particular application, various other V's may be utilized in other situations.

Experimentation and research has shown that the majority of heat emission from U-shaped radiant tubes occurs in the firing legs and headers. Thus the exhaust legs contribute little to the heating effect. Therefore, the use of one exhaust leg with two firing legs results in a heating potential substantially equivalent to that which may be attained with two U-shaped radiant tubes, but with the use of less alloy and occupying less space.

I claim:

1. In a heating furnace, a heating element comprising: three tubular members including two extreme members and an intermediate member, substantially parallel, and arranged in a common plane, said intermediate member serving as a radiation shield between said extreme two members; a removable bung contained in a wall of the furnace through which said members pass, said bung comprising a metal frame surrounding that portion of said members adjacent said wall, a cover plate attached to the outer edge of said frame, the extreme two members being gas tightly attached to said cover plate, and a refractory material contained in the volume formed by said frame and said cover plate and surrounding said members; a resilient material between the intermediate member and said cover plate whereby said intermediate member is capable of moving through said cover plate and retaining a gas tight seal therewith; a burner adjacent an end of each of the extreme two tubular members and capable of firing thereinto; a header connected to the other ends of said extreme two members and to a corresponding end of the intermediate member to provide separate passages from each of said extreme two members to said intermediate member for products of combustion from said burners; and means for producing suction at the end of said intermediate member opposite the header end for creating a pressure differential in said members and thereby causing a flow of products of combustion from said extreme members to said intermediate member.

2. In a heating furnace having a refractory lined metal wall, a heating element comprising: three tubular members including two extreme members and an intermediate member, substantially parallel and arranged in a common plane; said intermediate member being disposed between said two extreme members; a cover plate forming a part of said metal wall, the extreme two members being gas tightly attached to said cover plate; a refractory material adjacent said wall, surrounding said tubular members and forming an effective part of the refractory lining thereof; a resilient material between the intermediate member and said cover plate whereby said intermediate member is capable of moving through said cover plate and retaining a substantially gas tight seal therewith; a burner adjacent an end of each of the extreme two tubular members and capable of firing thereinto; and a header connected to the other ends of said extreme two members and to a corresponding end of the intermediate member to provide separate passages from each of said extreme two members to said intermediate member for products of combustion from said burners.

3. In a heating furnace having a refractory lined metal wall, a heating element comprising: three tubular members including two extreme members and an intermediate member, substantially parallel and arranged in a common plane; said intermediate member being disposed between said two extreme members; a cover plate forming a part of said metal wall, the extreme two members being gas tightly attached to said cover plate; a refractory material adjacent said wall, surrounding said tubular members and forming an effective part of the refractory lining thereof; a resilient material between the intermediate member and said cover plate whereby said intermediate member is capable of moving through said cover plate and retaining a substantially gas tight seal therewith; a burner adjacent an end of each of the extreme two tubular members and capable of firing thereinto; a header connected to the other ends of said extreme two members and to a corresponding end of the intermediate member to provide separate passages from each of said extreme two members to said intermediate member for products of combustion from said burners; and means for producing suction at the end of said intermediate member opposite the header end for creating a pressure differential in said members and thereby causing a flow of products of combustion from said extreme members to said intermediate member.

4. In a heating furnace having a refractory lined metal wall, in combination, a base for supporting a work load, an inner cylindrical cover adapted to surround said work load, and a plurality of heating elements each comprising: three tubular members including two extreme members and an intermediate member, substantially parallel and arranged in a common plane; said intermediate member being disposed between said two extreme members; a cover plate forming a part of said metal wall, the extreme two members being gas tightly attached to said cover plate; a refractory material adjacent said wall, surrounding said tubular members and forming an effective part of the refractory lining thereof; a resilient material between the intermediate member and said cover plate whereby said intermediate member is capable of moving through said cover plate and retaining a substantially gas tight seal therewith; a burner adjacent an end of each of the extreme two tubular members, and capable of firing thereinto; and a header connected to the other ends of said extreme two members and to a corresponding end of the intermediate member to provide separate passages from each of said extreme two members to said intermediate member for products of combustion from said burners.

References Cited in the file of this patent

UNITED STATES PATENTS

| | | |
|---|---|---|
| 2,091,980 | Hamlink | Sept. 7, 1937 |
| 2,093,381 | Munford | Sept. 14, 1937 |
| 2,271,168 | Booth | Jan. 27, 1942 |
| 2,293,813 | Fisher | Aug. 25, 1942 |
| 2,472,497 | Stookey | June 7, 1949 |
| 2,495,673 | Erwin | Jan. 24, 1950 |

FOREIGN PATENTS

| | | |
|---|---|---|
| 164,491 | Great Britain | June 9, 1921 |
| 793,883 | France | Feb. 3, 1936 |